(12) United States Patent
Kobayashi et al.

(10) Patent No.: US 10,670,875 B2
(45) Date of Patent: Jun. 2, 2020

(54) DIFFRACTIVE OPTICAL ELEMENT, OPTICAL SYSTEM INCLUDING DIFFRACTIVE OPTICAL ELEMENT, IMAGING APPARATUS, AND LENS DEVICE

(71) Applicant: CANON KABUSHIKI KAISHA, Tokyo (JP)

(72) Inventors: Mikio Kobayashi, Utsunomiya (JP); Reona Ushigome, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/934,576

(22) Filed: Mar. 23, 2018

(65) Prior Publication Data

US 2018/0284474 A1 Oct. 4, 2018

(30) Foreign Application Priority Data

Mar. 29, 2017 (WO) .................. PCT/JP2017/013000

(51) Int. Cl.
*G02B 27/42* (2006.01)
*G02B 5/18* (2006.01)
*G02B 23/18* (2006.01)

(52) U.S. Cl.
CPC ....... *G02B 27/4272* (2013.01); *G02B 5/1895* (2013.01); *G02B 27/4211* (2013.01); *G02B 23/18* (2013.01)

(58) Field of Classification Search
CPC .............. G02B 27/4272; G02B 5/1895; G02B 27/4211; G02B 23/18
See application file for complete search history.

(56) References Cited

U.S. PATENT DOCUMENTS

| 2011/0304918 A1* | 12/2011 | Ushigome | ............ | G02B 5/1895 359/576 |
| 2012/0262788 A1* | 10/2012 | Ushigome | .............. | B82Y 20/00 359/576 |

FOREIGN PATENT DOCUMENTS

JP          2011-257689 A       12/2011

* cited by examiner

*Primary Examiner* — Wen Huang
(74) *Attorney, Agent, or Firm* — Canon U.S.A., Inc., IP Division

(57) ABSTRACT

A diffractive optical element 10 includes a first diffraction grating 4, a second diffraction grating 5, films 6 formed between the first diffraction grating 4 and the second diffraction grating 5. The DOE 10 satisfies a conditional expression of $n_2 < n_1 < n_{ha}$, where $n_{ha}$ is an average refractive index of films 6b formed between grating wall surfaces 4b and grating wall surfaces 5b at a wavelength of 550 nm, $n_1$ is a refractive index of the first diffraction grating 4 at a wavelength of 550 nm, and $n_2$ is a refractive index of the second diffraction grating 5 at a wavelength of 550 nm. The films 6b and films 6a that are formed between grating surfaces 4a and grating surfaces 5a satisfy a predetermined relationship.

17 Claims, 12 Drawing Sheets

DIFFRACTIVE OPTICAL ELEMENT, OPTICAL SYSTEM INCLUDING DIFFRACTIVE OPTICAL ELEMENT, IMAGING APPARATUS, AND LENS DEVICE

This application claims the benefit of International Patent Application No. PCT/JP2017/013000, filed Mar. 29, 2017, which is hereby incorporated by reference herein in its entirety.

TECHNICAL FIELD

The present invention relates to a diffractive optical element for use in an optical system such as a digital camera.

BACKGROUND ART

It has been known that the diffraction efficiency of a diffractive optical element including a sawblade-like diffraction grating (blazed grating) is improved in a manner in which a film is formed on a grating wall surface to form a waveguide.

PTL 1 discloses a diffractive optical element having a waveguide.

PTL 1 also discloses that films are formed on grating wall surfaces, and at this time, films are formed also on grating surfaces to readily obtain the diffractive optical element having the waveguide at a low cost.

CITATION LIST

Patent Literature

PTL 1: Japanese Patent Laid-Open No. 2011-257689

However, the diffractive optical element including the films on the grating surfaces carries a risk of an increase in the light reflectance of each grating surface.

It is an object of the present invention to decrease the reflectance of each grating surface in the diffractive optical element including films between a first diffraction grating and a second diffraction grating.

SUMMARY OF INVENTION

A diffractive optical element according to the present invention includes a first diffraction grating, a second diffraction grating, and a film formed between the first diffraction grating and the second diffraction grating. The following conditional expressions are satisfied:

$$n_2 < n_1 < n_{ha}, \text{ and}$$

$$n_{sa} < n_{ha},$$

where $n_{ha}$ is an average refractive index of parts of the film that are formed between a grating wall surface of the first diffraction grating and a grating wall surface of the second diffraction grating at a wavelength of 550 nm, $n_{sa}$ is an average refractive index of parts of the film that are formed between a grating surface of the first diffraction grating and a grating surface of the second diffraction grating at a wavelength of 550 nm, $n_1$ is a refractive index of the first diffraction grating at a wavelength of 550 nm, and $n_2$ is a refractive index of the second diffraction grating at a wavelength of 550 nm.

Another diffractive optical element according to the present invention includes a first diffraction grating, a second diffraction grating, and a film formed between the first diffraction grating and the second diffraction grating. The following conditional expressions are satisfied:

$$n_2 < n_1 < n_{ha}, \text{ and}$$

$$d_{sa} < d_{ha},$$

where $n_{ha}$ is an average refractive index of parts of the film that are formed between a grating wall surface of the first diffraction grating and a grating wall surface of the second diffraction grating at a wavelength of 550 nm, $d_{ha}$ is an average thickness of parts of the film that are formed between the grating wall surface of the first diffraction grating and the grating wall surface of the second diffraction grating, $d_{sa}$ is an average thickness of parts of the film that are formed between a grating surface of the first diffraction grating and a grating surface of the second diffraction grating, $n_1$ is a refractive index of the first diffraction grating at a wavelength of 550 nm, and $n_2$ is a refractive index of the second diffraction grating at a wavelength of 550 nm.

Further features of the present invention will become apparent from the following description of exemplary embodiments with reference to the attached drawings.

DESCRIPTION OF EMBODIMENTS

Embodiments of the present invention will hereinafter be described with reference to the drawings.

First Embodiment

Figure 1A:
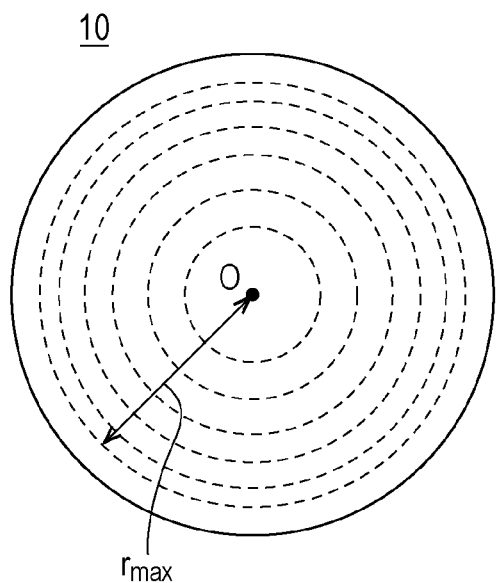
FIGS. 1A and 1B illustrate schematic views of a diffractive optical element.
Figure 1B:
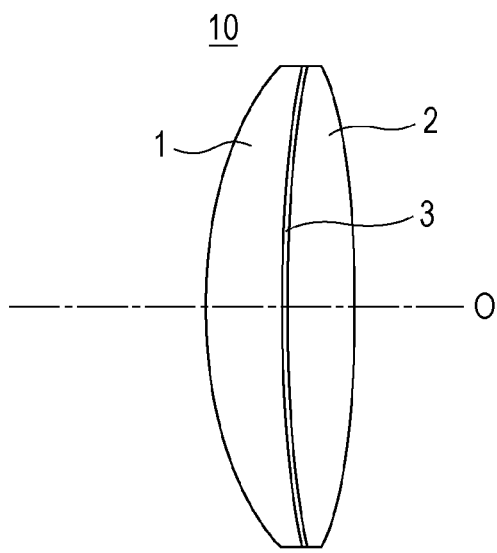

FIGS. 1A and 1B illustrate schematic views of a diffractive optical element (referred to below as a DOE) 10 according to the present embodiment. As illustrated in FIG. 1A, the DOE 10 according to the present embodiment has a circular shape.

In FIG. 1A, concentric circles illustrated by dashed lines schematically illustrate the shape of a first diffraction grating described later.

FIG. 1B is a sectional view of the DOE 10. As illustrated in FIG. 1B, the DOE 10 includes a first substrate 1 and a second substrate 2, and a diffraction grating portion 3 is disposed between the first substrate 1 and the second substrate 2. In FIG. 1B, O represents the central axis of the DOE 10. In an optical system such as an imaging apparatus that uses the DOE 10, the DOE 10 is disposed such that the central axis O coincides with the optical axis of the optical system.

Figure 2:
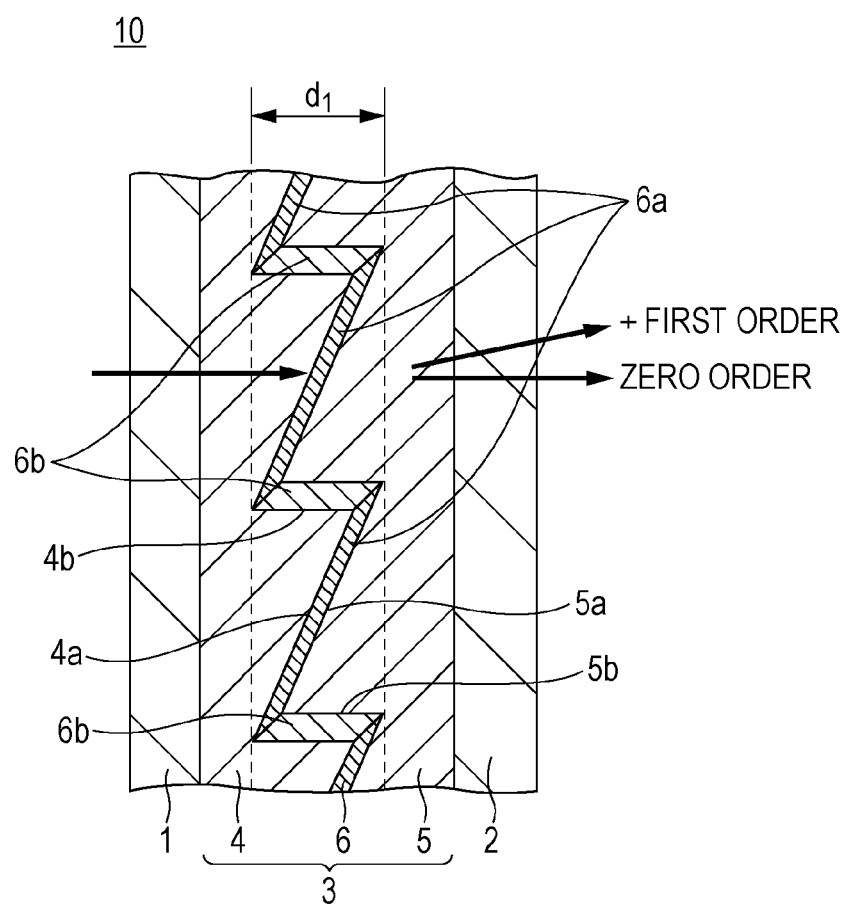
FIG. 2 is an enlarged view of a diffraction grating portion of the diffractive optical element.

FIG. 2 is an enlarged view of the diffraction grating portion 3.

FIG. 2 schematically illustrates the diffraction grating portion 3 with dimensions that differ from actual dimensions. The diffraction grating portion 3 includes a first diffraction grating 4, a second diffraction grating 5, and films 6.

The first diffraction grating 4 is disposed on the first substrate 1. The refractive index of the first diffraction grating 4 at a wavelength of 550 nm is $n_1$.

The first diffraction grating 4 includes grating surfaces 4a and grating wall surfaces 4b that alternate and is a sawblade-like diffraction grating (blaze structure).

Among surfaces that the sawblade-like diffraction grating includes, the grating surfaces 4a have the surface normal that forms a small angle with the central axis O. Among the surfaces that the sawblade-like diffraction grating includes, the grating wall surfaces 4b have the surface normal that forms a large angle with the central axis O.

The second diffraction grating 5 is disposed on the second substrate 2. The refractive index of the second diffraction grating 5 at a wavelength of 550 nm is $n_2$. $n_2$ is less than $n_1$.

The second diffraction grating 5 includes grating surfaces 5a and grating wall surfaces 5b that alternate as in the first diffraction grating 4 and is a sawblade-like diffraction grating (blaze structure).

Among surfaces that the sawblade-like diffraction grating includes, the grating surfaces 5a have the surface normal that forms a small angle with the central axis O. Among the surfaces that the sawblade-like diffraction grating includes, the grating wall surfaces 5b have the surface normal that forms a large angle with the central axis O.

The circles illustrated by the dashed lines in FIG. 1A represent boundaries between the grating surfaces 4a and the grating wall surfaces 4b of the first diffraction grating 4. As illustrated in FIG. 1A, the first diffraction grating 4 is concentric with the circles, and the center thereof is the central axis O. The same is true for the second diffraction grating 5. The second diffraction grating 5 is concentric with the circles and the center thereof is the central axis O.

Among the boundaries between the grating surfaces 4a and the grating wall surfaces 4b of the first diffraction grating 4, the boundary farthest from the central axis O has a radius referred to as $r_{max}$.

As illustrated in FIG. 1A, the grating pitches of the first diffraction grating 4 and the second diffraction grating 5 are gradually varied in accordance with a distance from the central axis O, and this enables the diffraction grating portion 3 to have a lens effect (convergence and divergence of light).

The films 6 are formed between the first diffraction grating 4 and the second diffraction grating 5. According to the embodiment, the first diffraction grating 4 and the second diffraction grating 5 are in close contact with the films 6. A distance between an envelope connecting valleys of the first diffraction grating 4 and an envelope connecting valleys of the second diffraction grating 5 is equal to a grating thickness $d_1$ of the DOE 10.

In the following description, some of the films 6 that are formed between the grating surfaces 4a and the grating surfaces 5a are referred to as films 6a. The others of the films 6 that are formed between the grating wall surfaces 4b and the grating wall surfaces 5b are referred to as films 6b. The refractive index of each film 6a at a wavelength of 550 nm and at a position a distance r away from the central axis O is referred to as $n_s(r)$.

The refractive index of each film 6b at a wavelength of 550 nm and at a position the distance r away from the central axis O is referred to as $n_h(r)$.

The thickness of each film 6a at a position the distance r away from the central axis O is referred to as $d_s(r)$. The thickness of each film 6a means the thickness in the direction of the surface normal of the corresponding grating surface 4a.

The thickness of each film 6b at a position the distance r away from the central axis O is referred to as $d_h(r)$. The thickness of each film 6b is equal to the thickness in the direction of the surface normal of the corresponding grating wall surface 4b.

As illustrated in FIG. 2, the films 6a are present in the DOE 10 for the corresponding grating surfaces. For this reason, $n_s(r)$ and $d_s(r)$ have discrete values defined with respect to r at which there are the films 6a. The films 6b are present for the corresponding grating wall surfaces. For this reason, $n_h(r)$ and $d_h(r)$ have discrete values defined with respect to r at which there are the films 6b.

In the DOE 10, a condition under which the diffraction efficiency of diffracted light in the m-th order is maximum is given as the following expression (1).

$$\Phi(\lambda) = -(n_2(\lambda) - n_1(\lambda)) \times d_1 = m\lambda \quad (1)$$

$\Phi(\lambda)$ represents the maximum value of a difference in optical path length due to the diffraction grating portion 3. $\lambda$ represents the wavelength of light. $n_1(\lambda)$ is the refractive index of the first diffraction grating 4 at a wavelength $\lambda$. $n_2(\lambda)$ is the refractive index of the second diffraction grating 5 at the wavelength $\lambda$.

In the expression (1), m represents a diffraction order and is an integer value. In the expression (1), when light parallel to the central axis O is incident from the first diffraction grating 4 toward the second diffraction grating 5 and diffracted in the direction in which the light approaches the central axis O, the diffraction order is positive (m>0), and when the incident light is diffracted in the direction in which the light leaves from the central axis O, the diffraction order is negative (m<0).

The DOE 10 is designed to improve the diffraction efficiency in a specific diffraction order (for example, m=1) on the basis of the expression (1). In practice, however, a phase aberration occurs on the wavefront of a luminous flux that passes through the vicinities of the grating wall surfaces 4b and 5b. When the degree of the phase aberration is large and is not negligible, the actual diffraction efficiency is lower than the diffraction efficiency that is estimated from the difference in optical path length in the expression (1). In view of this, the DOE 10 includes the films 6b that satisfy the following conditional expression (2).

$$n_2 < n_1 < n_{ha} \tag{2}$$

In the expression, $n_{ha}$ is obtained by averaging the refractive index $n_h(r)$ of each film 6b at a wavelength of 550 nm with respect to r. $n_{ha}$ can be obtained by dividing the sum of the refractive indices of the films 6b present for the corresponding grating wall surfaces 4b and 5b by the number of the grating wall surfaces.

When the sum of the refractive indices of the films 6b present for the corresponding grating wall surfaces 4b and 5b is obtained, the refractive index of each film 6b at a representative point is used as the representative value of $n_h(r)$.

The films 6b function as waveguides when satisfying the expression (2). Parts of the luminous flux that are incident on the vicinities of the grating wall surfaces 4b and the grating wall surfaces 5b are confined in the inside of the films 6b and propagate through the inside of the films 6b. This reduces the phase aberration of the luminous flux passing through the vicinities of the grating wall surfaces 4b and 5b, and consequently, the diffraction efficiency of the DOE 10 can be improved.

In the case where the films 6b are formed between the grating wall surfaces 4b and the grating wall surfaces 5b, the formation of the films between the grating surfaces 4a and the grating surfaces 5a is permitted to readily obtain the DOE 10.

However, forming films having a large refractive index between the grating surfaces 4a and the grating surfaces 5a results in an increase in the reflectance of each grating surface of the DOE 10, and may cause a flare or a ghost.

In view of this, the films 6a are formed so as to satisfy the following conditional expression (3), the following expression (4), or both of the expressions to decrease the reflectance of each grating surface of the DOE 10.

$$n_{sa} < n_{ha} \tag{3}$$

$$0 < d_{sa} < d_{ha} \tag{4}$$

In the expressions, $n_{sa}$ is obtained by dividing the sum of the refractive indices of the films 6a present for the corresponding grating surfaces by the number of the grating surfaces, $d_{sa}$ is obtained by dividing the sum of the thicknesses of the films 6a present for the corresponding grating surfaces by the number of the grating surfaces, and $d_{ha}$ is obtained by dividing the sum of the thicknesses of the films 6b present for the corresponding grating wall surfaces by the number of the grating wall surfaces.

When the sum of the refractive indices of the films 6a present for the corresponding grating surfaces is obtained, the refractive index of each film 6a at a representative point is used as the representative value of $n_s(r)$. When the sum of the thicknesses of the films 6a present for the corresponding grating surfaces is obtained, the thickness of each film 6a at a representative point is used as the representative value of $d_s(r)$.

When the sum of the thicknesses of the films 6b present for the corresponding grating wall surfaces is obtained, the thickness of each film 6b at a representative point is used as the representative value of $d_h(r)$.

The expression (3) will be described. The reflectances at the interfaces between the grating surfaces 4a and the films 6a tend to decrease as differences in the refractive indices between the first diffraction grating 4 and the films 6a decrease. Similarly, the reflectances at the interfaces between the grating surfaces 5a and the films 6a tend to decrease as differences in the refractive indices between the second diffraction grating 5 and the films 6a decrease.

Accordingly, the reflectance of each grating surface of the DOE 10 can be decreased in a manner in which the films 6a are formed so as to satisfy the expression (3). The reflectance of each grating surface of the DOE 10 means the net reflectance affected by interference of reflected light from the interfaces between the films 6a and the grating surfaces 4a and reflected light from the interfaces between the films 6a and the grating surfaces 5a.

The expression (4) will now be described. The degree of the dependence of the reflectance of each grating surface on the wavelength tends to decrease as the thickness of each film 6a decreases. In contrast, as the thickness of each film 6a increases, the reflectance of each grating surface increases at a certain wavelength range.

Accordingly, the films 6a are formed so as to satisfy the expression (4), this enables the degree of the dependence of the reflectance of each grating surface on the wavelength to be smaller than in the case where films having a uniform thickness are formed between the first diffraction grating 4 and the second diffraction grating 5, and the reflectance can be decreased at a wide wavelength range.

When the expression (3), the expression (4), or both of the expressions are satisfied, the reflectance of each grating surface can be decreased. However, both of the expression (3) and the expression (4) are preferably satisfied.

The DOE 10 that satisfies the expression (4) preferably satisfies the following conditional expression (5).

$$0.1 < d_{sa}/d_{ha} < 0.9 \tag{5}$$

The thicknesses of the films 6a and the films 6b can be readily controlled during manufacture of the DOE 10 in a manner in which $d_{sa}/d_{ha}$ is increased to more than the lower limit of the expression (5).

Consequently, the DOE 10 can be readily manufactured.

The degree of the dependence of the reflectance of each grating surface on the wavelength can be further decreased in a manner in which $d_{sa}/d_{ha}$ is decreased to less than the upper limit of the expression (5).

The range of the expression (5) is preferably equal to the range of the following expression (5a).

$$0.3 < d_{sa}/d_{ha} < 0.85 \tag{5a}$$

To further decrease the reflectance of each grating surface of the DOE 10, the following conditional expression (6) is preferably satisfied.

$$(n_1 + n_2 - 2n_s(r))^2 < 0.3 \tag{6}$$

The expression (6) indicates that there are small differences between the refractive index of each of the films 6a present for the corresponding grating surfaces and the refractive indices of the first diffraction grating 4 and the second diffraction grating 5. When the differences between the refractive index of each film 6a and the refractive indices of the first diffraction grating 4 and the second diffraction grating 5 are more than the upper limit of the expression (6), it is difficult to sufficiently decrease the reflectance of each grating surface of the DOE 10.

For this reason, when the expression (6) is satisfied in at least a certain range of r, the reflectance of each grating surface can be further decreased.

The expression (6) is more preferably satisfied regardless of the value of r.

The reflectance of each grating surface of the DOE 10 is determined by the interference of reflected light made at the interfaces between the grating surfaces 4a and the films 6a and reflected light made at the interfaces between the films 6a and the grating surfaces 5a. Accordingly, the reflectance varies also depending on the thickness of each film 6a.

Accordingly, to further decrease the reflectance of each grating surface, the following conditional expression (7) is preferably satisfied.

$$[\sin\{\alpha \times d_s(r)\} \times \{n_1+n_2-2n_s(r)\}]^2 < 0.2 \quad (7)$$

The unit of $d_s(r)$ is nm (nanometer), and a is 0.016564 nm$^{-1}$. The range of the expression (7) is more preferably equal to the range of the following expression (7a), further preferably equal to the range of the following expression (7b).

$$[\sin\{\alpha \times d_s(r)\} \times \{n_1+n_2-2n_s(r)\}]^2 < 0.16 \quad (7a)$$

$$[\sin\{\alpha \times d_s(r)\} \times \{n_1+n_2-2n_s(r)\}]^2 < 0.12 \quad (7b)$$

To further decrease the reflectance of each grating surface and to increase the effect of confining light in the films 6b, the following the expression (8) is preferably satisfied.

$$|(2n_{sa}-n_1-n_2)/(n_{ha}-n_1)| < 5 \quad (8)$$

The numerator of the expression (8) is a difference obtained by subtracting the refractive indices of the first diffraction grating 4 and the second diffraction grating 5 from the refractive index of the films 6a, and the reflectance tends to decrease as the absolute value of the numerator of the expression (8) decreases.

The denominator of the expression (8) is a difference obtained by subtracting the refractive index of each grating wall surface 4b from the refractive index of the films 6b. The effect of confining light can be increased in a manner in which the value of the denominator of the expression (8) is increased to a certain extent.

Accordingly, when the expression (8) is satisfied, the effect of confining light in the films 6b can be increased, and the reflectance of each grating surface can be decreased.

The range of the expression (8) is more preferably equal to the range of the following expression (8a).

$$|(2n_{sa}-n_1-n_2)/(n_{ha}-n_1)| < 3 \quad (8a)$$

To increase the effect of confining light in the films 6b and to decrease unnecessary light made at the grating wall surfaces 4b and the grating wall surfaces 5b, the expression (9) is preferably satisfied, and the expression (9a) is more preferably satisfied.

$$0.5 \le d_h(r)/W_c \le 2 \quad (9)$$

$$0.75 \le d_h(r)/W_c \le 1.75 \quad (9a)$$

In the expression (9), $W_c$ is given as the following expression (10) that uses cutoff width $W_{c,\,TE}$ related to TE polarization and cutoff width $W_{c,\,TM}$ related to TM polarization.

$$W_c = (W_{c,TE} + W_{c,TM})/2 \quad (10)$$

$W_{c,\,TE}$ and $W_{c,\,TM}$ will now be described. The first diffraction grating 4, the films 6b, and the second diffraction grating 5 satisfy the expression (2) as described above. In this case, when attention is paid to the grating wall surfaces, the first diffraction grating 4, the films 6b, and the second diffraction grating 5 are regarded as an asymmetric three-layer plate waveguide.

In general, the characteristic equation of an asymmetric three-layer plate waveguide is given as the following expressions (11) and (12), where $n_g$ is the refractive index of a waveguide layer (layer that functions as a waveguide) and $n_{c1}$ and $n_{c2}$ are the refractive indices of cladding layers (layers that interpose the waveguide layer therebetween), provided that $n_g > n_{c1} > n_{c2}$. The expression (11) corresponds to a TE mode. The expression (12) corresponds to a TM mode.

$$\tan(\kappa_{TE}W) = \frac{\kappa_{TE}(\gamma_{TE}+\delta_{TE})}{(\kappa_{TE}^2 - \gamma_{TE}\delta_{TE})} \quad (11)$$

$$\kappa_{TE} = \sqrt{k_0^2 n_g^2 - \beta_{TE}^2}$$

$$\gamma_{TE} = \sqrt{\beta_{TE}^2 - k_0^2 n_{c1}^2}$$

$$\delta_{TE} = \sqrt{\beta_{TE}^2 - k_0^2 n_{c2}^2}$$

$$\tan(\kappa_{TM}W) = \frac{n_g^2 \kappa_{TM}(n_{c2}^2 \gamma_{TM} + n_{c1}^2 \delta_{TM})}{(n_{c2}^2 n_{c1}^2 \kappa_{TM}^2 - n_g^4 \gamma_{TM}\delta_{TM})} \quad (12)$$

$$\kappa_{TM} = \sqrt{k_0^2 n_g^2 - \beta_{TM}^2}$$

$$\gamma_{TM} = \sqrt{\beta_{TM}^2 - k_0^2 n_{c1}^2}$$

$$\delta_{TM} = \sqrt{\beta_{TM}^2 - k_0^2 n_{c2}^2}$$

In the expressions, W is the thickness of the waveguide layer, $\beta_{TM}$ is a propagation constant of the TM polarization, and $\beta_{TE}$ is a propagation constant of the TE polarization. $k_0$ is given as an expression of $k_0 = 2\pi/\lambda$, where $\lambda$ is the wavelength of light.

In this case, consideration of a cutoff width that causes a single mode enables the following expression (13) related to the TE polarization and the following expression (14) related to the TM polarization to be obtained.

$$W_{C,TE} = \frac{1}{\kappa_C}\tan^{-1}\left(\frac{\delta_C}{\kappa_C}\right) \quad (13)$$

$$W_{C,TM} = \frac{1}{\kappa_C}\tan^{-1}\left(\frac{n_g^2 \delta_C}{n_{c2}^2 \kappa_C}\right) \quad (14)$$

$\kappa_c$ is given as the following expression (15). $\delta_c$ is given as the following expression (16).

$$\kappa_C = k_0\sqrt{n_g^2 - n_{c1}^2} \quad (15)$$

$$\delta_C = k_0\sqrt{n_{c1}^2 - n_{c2}^2} \quad (16)$$

According to the embodiment, $n_{c1}$ corresponds to the refractive index $n_1$ of the first diffraction grating 4, $n_{c2}$ corresponds to the refractive index $n_2$ of the second diffraction grating 5, and $n_g$ at a wavelength of 550 nm corresponds to the refractive index $n_h(r)$ of the films 6b.

Accordingly, the use of the expressions (13) and (14) enables $W_{c,\,TE}$ and $W_{c,\,TM}$ in the DOE 10 to be obtained.

The effect of confining light in the films 6b of the DOE 10 can be further increased in a manner in which the thickness $d_h(r)$ of the films 6b is adjusted to about $W_c$ obtained as above. When the expression (9) is more than the upper limit or is less than the lower limit, it is difficult to sufficiently increase the effect of confining light in the films $6b$.

Accordingly, when the expression (9) is satisfied in at least a certain range of r, the diffraction efficiency can be further improved. Even when light is incident diagonally on the DOE 10, unnecessary light made at the grating wall surfaces can be further decreased.

The expression (9) is preferably satisfied regardless of the value of r.

The effect of confining light in the films $6b$ over the entire DOE 10 can be estimated by the value of $(n_{ha}-n_1)\times d_{ha}$. To further increase the effect of confining light in the films $6b$, the following expression (17) is preferably satisfied.

$$7<(n_{ha}-n_1)\times d_{ha}<30 \text{ [nm]} \tag{17}$$

The effect of confining light in the films $6b$ can be further increased in a manner in which the value of $(n_{ha}-n_1)\times d_{ha}$ is adjusted in the range of the expression (17), and the diffraction efficiency can be further improved.

Even when light is incident diagonally on the DOE 10, unnecessary light made at the grating wall surfaces can be further decreased.

The range of the expression (17) is preferably equal to the range of the following expression (17a).

$$<(n_{ha}-n_1)\times d_{ha}<20 \text{ [nm]} \tag{17a}$$

To decrease the degree of the dependence of the effect of confining light in the films $6b$ on the polarization, the relative refractive index difference is preferably small. However, an excessively small relative refractive index difference causes the effect of confining light in the films $6b$ to decrease. That is, the function of the films $6b$ as the waveguides is decreased.

In view of this, to maintain the effect of confining light in the films $6b$ and to decrease the degree of the dependence on the polarization, the following expression (18) is preferably satisfied.

$$0.005<\Delta<0.045 \tag{18}$$

In the expression, $\Delta$ is the relative refractive index difference. The relative refractive index difference $\Delta$ is given as the following expression (19).

$$\Delta = \frac{n_{ha}^2 - n_1^2}{2n_{ha}^2} \tag{19}$$

The degree of the dependence of the effect of confining light in the films $6b$ on the polarization can be decreased in a manner in which $\Delta$ is increased to more than the lower limit of the expression (18). The effect of confining light in the films $6b$ can be sufficiently increased in a manner in which $\Delta$ is decreased to less than the upper limit of the expression (18).

The range of the expression (18) is preferably equal to the range of the following expression (18a).

$$0.007<\Delta<0.042 \tag{18a}$$

The value of $\Delta$ at a wavelength of 400 nm is preferably smaller than the value of $\Delta$ at a wavelength of 700 nm. This decreases the degree of the dependence of the effect of confining light in the films $6b$ on the wavelength.

A method of manufacturing the DOE 10 will now be described.

Films are uniformly formed on the first diffraction grating 4 by, for example, sputtering or vapor deposition. Subsequently, the refractive indices and the thicknesses of the films formed on the grating surfaces $4a$ and the films formed on the grating wall surfaces $4b$ are adjusted such that the refractive indices satisfy the expression (3), the expression (4), or both of the expressions, and the films 6 can be obtained.

An example of a method of adjusting the refractive indices and the thicknesses is to dispose protective layers on the films formed on the grating wall surfaces $4b$ by using lithography or nanoimprint and subsequently to perform an etching process. This enables the effective refractive indices of the films formed on the grating surfaces $4a$ to be changed and enables the thicknesses thereof to be changed.

The effective refractive index of the films formed on the grating wall surfaces $4b$ may be changed or the thicknesses thereof may be changed in a manner in which protective layers are disposed on the films formed on the grating surfaces $4a$ by using lithography or nanoimprint, and subsequently, the etching process is performed.

Thus, the films 6 that satisfy the expression (3), the expression (4), or both of the expressions can be formed.

After the films 6 are thus formed, the second diffraction grating 5 is formed, and the DOE 10 can be obtained.

The method of manufacturing the DOE 10 is not limited to the above manufacturing method.

The materials of the first diffraction grating 4, the second diffraction grating 5, and the films 6 of the DOE 10 are not particularly limited provided that the expression (2) is satisfied. However, the refractive index dispersion of the material of the first diffraction grating 4 preferably differs from the refractive index dispersion of the material of the second diffraction grating 5. Specifically, the following conditional expressions (20) and (21) are preferably satisfied.

$$vd_1>35 \tag{20}$$

$$vd_2<25 \tag{21}$$

In the expression (20), $vd_1$ is the Abbe number of the first diffraction grating 4.

In the expression (21), $vd_2$ is the Abbe number of the second diffraction grating 5.

The Abbe number of a medium is given as the following expression (22), where Ng, NF, Nd, and NC respectively represent the refractive index of the medium at the g-line, the F-line, the d-line, and the C-line of the Fraunhofer lines.

$$vd=(Nd-1)/(NF-NC) \tag{22}$$

Thus, a higher diffraction efficiency can be obtained across visible wavelengths (400 to 700 nm).

To obtain a higher diffraction efficiency, the first diffraction grating 4 and the second diffraction grating 5 are preferably designed such that an integer m satisfies the following conditional expression (23) at $\lambda=550$ nm.

$$0.960\leq(n_1-n_2)\times d1/(m\times\lambda)\leq 1.040 \tag{23}$$

This further improves the diffraction efficiency of diffracted light in the m-th order.

In the case where the DOE 10 is used as a component of the optical system, the amount of light passing through the DOE 10 at the central portion of the DOE 10 is larger than in the periphery thereof. For this reason, reflected light from the central portion of the DOE 10 is more likely to cause a flare or a ghost than reflected light from the periphery of the DOE 10.

When the first diffraction grating 4 has a curvature as in the DOE 10 illustrated in FIGS. 1A and 1B, and the films are formed on the first diffraction grating 4 by vapor deposition, the thickness of the first diffraction grating 4 at the central portion differs from the thickness at the periphery in some cases. In these cases, the thickness of the films 6a is preferably adjusted so as to satisfy the following conditional expression (24).

$$d_{sc} < d_{se} \quad (24)$$

In the expression (24), $d_{sc}$ is an average thickness of the films 6a at the central portion of the DOE 10, and is obtained by averaging $d_s(r)$ in the range from r=0 to r=$r_{max}$/3.

In the expression (24), $d_{se}$ is an average thickness of the films 6a at the periphery of the DOE 10, and is obtained by averaging $d_s(r)$ in the range from r=$2r_{max}$/3 to r=$r_{max}$.

When the expression (24) is satisfied, the degree of the dependence of the reflectance on the wavelength can be decreased at the central portion of the DOE 10, and the reflectance can be decreased at a wider wavelength range. Consequently, in the case where the DOE 10 is used as a component of the optical system, the occurrence of a flare or a ghost due to reflected light from the grating surfaces of the DOE 10 can be further decreased.

When the diffraction grating portion 3 has a curvature as in the DOE 10 illustrated in FIGS. 1A and 1B, a manufacturing error of the thickness of the films 6 to be formed tends to increase particularly at the periphery of the DOE 10. For this reason, to decrease a variation in the effect of confining light in the films 6b due to a variation in the refractive index, the following conditional expression (25) is preferably satisfied.

$$d_{hc} < d_{he} \quad (25)$$

In the expression (25), $d_{hc}$ is an average thickness of the films 6b at the central portion of the DOE 10 and is obtained by averaging $d_h(r)$ in the range in which the distance from the central axis O is no less than 0 and no more than $r_{max}$/3. In the expression (25), $d_{he}$ is an average thickness of the films 6b at the periphery of the DOE 10 and is obtained by averaging $d_h(r)$ in the range in which the distance from the central axis O is no less than $2r_{max}$/3 and no more than $r_{max}$.

The fact that the expression (25) is satisfied means the thickness of the films 6b at the periphery of the DOE 10 is more than at the central portion of the DOE 10. The thickness of the films 6b is thus adjusted to adjust the refractive index $n_{he}$ of the films 6b at the periphery of the DOE 10 to less than the refractive index $n_{hc}$ of the films 6b at the central portion of the DOE 10. This decreases a variation in the effect of confining light in the films 6b due to a variation in the thickness. Consequently, the DOE 10 can be readily manufactured.

The refractive index $n_{hc}$ of the films 6b at the periphery of the DOE 10 is obtained by averaging $n_h(r)$ in the range in which the distance from the central axis O is no less than 0 and no more than $r_{max}$/3. $n_{he}$ is an average thickness of the films 6b at the periphery of the DOE 10 and is obtained by averaging $n_h(r)$ in the range in which the distance from the central axis O is no less than $2r_{max}$/3 and no more than $r_{max}$.

The characteristics of the DOE 10 according to the present embodiment will now be described.

The first diffraction grating 4 of the DOE 10 is formed of an acrylic resin containing zirconia ($ZrO_2$) fine particles. The refractive index of the first diffraction grating 4 is 1.6230 at a wavelength of 550 nm and 1.619 at the d-line of the Fraunhofer lines.

The Abbe number $vd_1$ of the first diffraction grating 4 is 43.2, and a partial dispersion ratio $\theta gF$ thereof is 0.564. The partial dispersion ratio $\theta gF$ is given as the following expression (26), where Ng, NF, Nd, and NC respectively represent the refractive index of the medium at the g-line, the F-line, the d-line, and the C-line of the Fraunhofer lines.

$$\theta gF = (Ng - NF)/(NF - NC) \quad (26)$$

The second diffraction grating 5 is formed of an acrylic resin containing indium tin oxide (ITO) fine particles. The refractive index of the second diffraction grating 5 is 1.5724 at a wavelength of 550 nm and 1.566 at the d-line of the Fraunhofer lines.

The Abbe number $vd_2$ of the second diffraction grating 5 is 19.0, and the partial dispersion ratio thereof is 0.418.

Each film 6 is formed of a material containing alumina ($Al_2O_3$) and zirconia ($ZrO_2$).

The grating thickness $d_1$ is 10.79 μm. The grating pitch is 100 to 3000 μm.

Figure 3A:
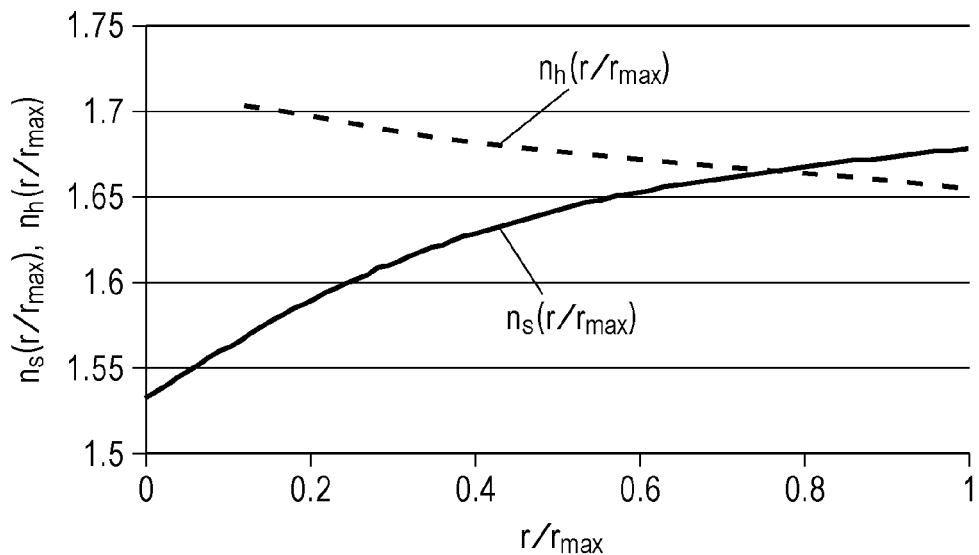
FIGS. 3A and 3B illustrate variations in the refractive indices of films and variations in the thicknesses thereof according to a first embodiment.

FIG. 3A illustrates the refractive index $n_s$ ($r/r_{max}$) of the films 6a of the DOE 10 according to the present embodiment with respect to light at a wavelength of 550 nm, and the refractive index $n_h$ ($r/r_{max}$) of the films 6b with respect to light at a wavelength of 550 nm. In FIG. 3A, $n_s(r/r_{max})$ is illustrated by a solid line, and $n_h$ ($r/r_{max}$) is illustrated by a dashed line.

ns ($r/r_{max}$) has discrete values defined with respect to r as described above. In FIG. 3A, the value of $n_s(r/r_{max})$ corresponding to r is illustrated by the solid line. The same is true for $n_h$ ($r/r_{max}$), and the value of $n_h(r/r_{max})$ corresponding to r is illustrated by the dashed line.

As seen from FIG. 3A, $n_s$ ($r/r_{max}$) is smaller than $n_h$ ($r/r_{max}$) over substantially the entire range. $n_{sa}$, which is obtained by averaging $n_s$ ($r/r_{max}$) with respect to r, is 1.6216. $n_{ha}$, which is obtained by averaging $n_h$ ($r/r_{max}$) with respect to r, is 1.6807. The DOE 10 satisfies the expression (3).

When the expression (3) is satisfied, the reflectance can be decreased over the entire DOE 10, and as illustrated in FIG. 3A, $n_h$ ($r/r_{max}$) may be smaller than $n_s(r/r_{max})$ at a part of the DOE 10.

As r increases, $n_s$ ($r/r_{max}$) increases. As r increases, $n_h$ ($r/r_{max}$) decreases. That is, the refractive index of the films 6a increases and the refractive index of the films 6b decreases from the center to the periphery of the DOE 10.

Figure 3B:
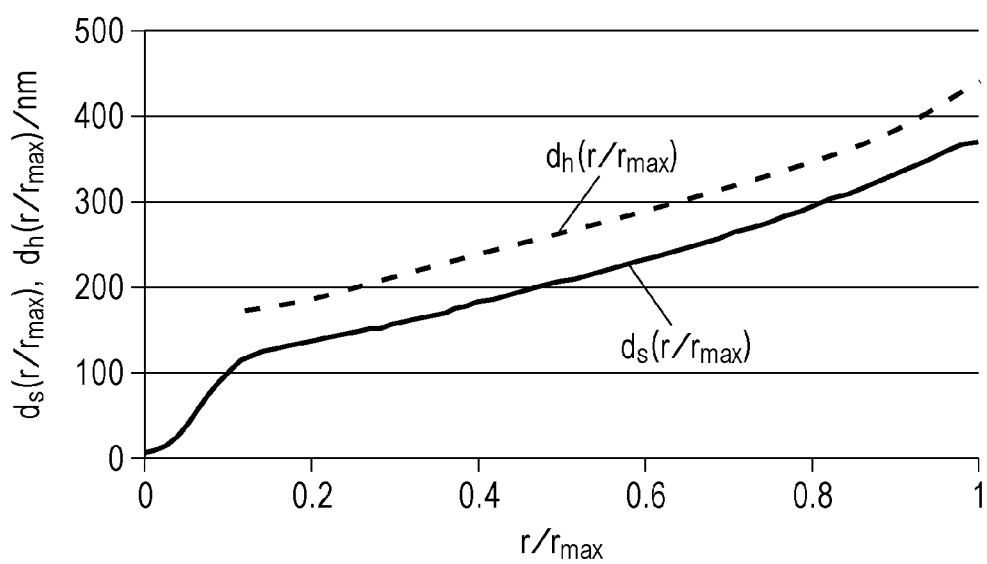

FIG. 3B illustrates the thickness $d_s$ ($r/r_{max}$) of the films 6a and the thickness $d_h$ ($r/r_{max}$) of the films 6b of the DOE 10 according to the present embodiment. In FIG. 3B, $d_s$ ($r/r_{max}$) is illustrated by a solid line, and $d_h$ ($r/r_{max}$) is illustrated by a dashed line.

$d_s$ ($r/r_{max}$) has discrete values defined with respect to r as described above. In FIG. 3B, the value of $d_s(r/r_{max})$ corresponding to r is illustrated by the solid line. The same is true for $d_h$ ($r/r_{max}$), the value of $d_h$ ($r/r_{max}$) corresponding to r is illustrated by the dashed line.

As illustrated in FIG. 3B, $d_h$ ($r/r_{max}$) is more than $d_s$ ($r/r_{max}$) regardless of the distance from the central axis O. $d_{sa}$, which is obtained by averaging $d_s$ ($r/r_{max}$) with respect to r, is 193 nm. $d_{ha}$, which is obtained by averaging $d_h$ ($r/r_{max}$) with respect to r, is 268 nm. The DOE 10 according to the present embodiment satisfies the expression (4).

As the distance from the central axis O increases, $d_s$ ($r/r_{max}$) and $d_h$ ($r/r_{max}$) increase. That is, the thicknesses of the films 6a and the films 6b increase from the center to the periphery of the DOE 10.

Figure 4:
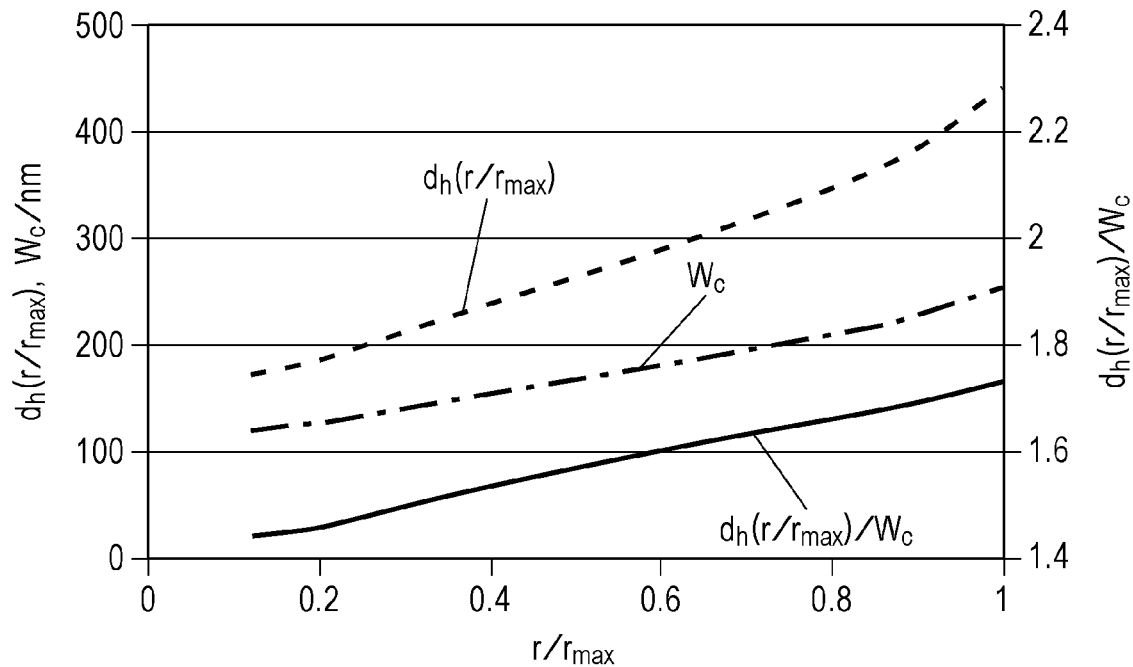
FIG. 4 illustrates values in an expression (9) according to the first embodiment.

FIG. 4 illustrates $d_h$ ($r/r_{max}$), an average value $W_c$ of the cutoff width of the TE polarization and the cutoff width of the TM polarization, and $d_h$ ($r/r_{max}$)/$W_c$ in the DOE 10 according to the present embodiment. The vertical axis on the left-hand side is referred for $d_h$ ($r/r_{max}$) illustrated by a dashed line and $W_c$ illustrated by a one-dot chain line. The vertical axis on the right-hand side is referred for $d_h$ $(r/r_{max})/W_c$ illustrated by a solid line.

As illustrated in FIG. 4, the DOE 10 satisfies the expression (9).

Figure 5:
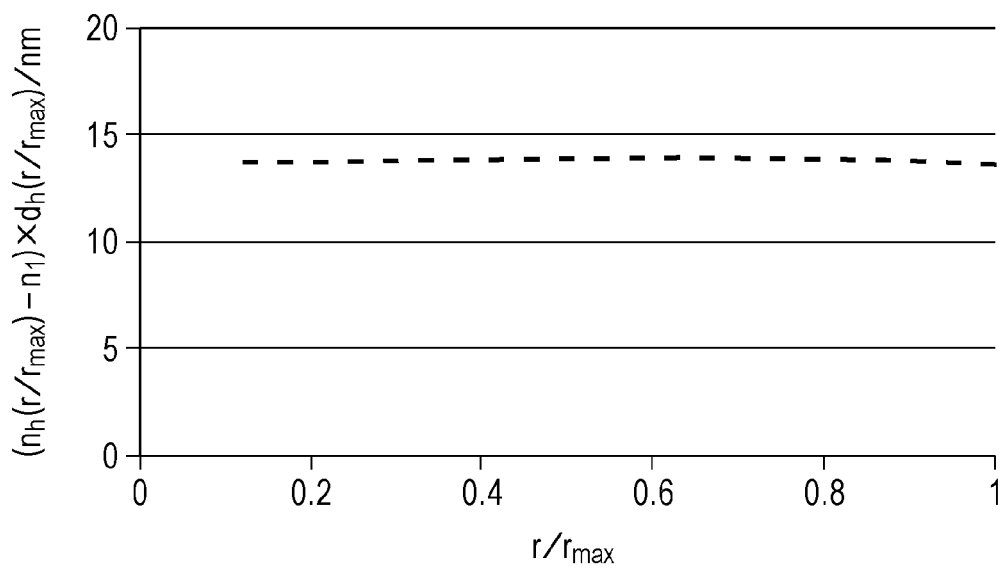
FIG. 5 illustrates a value in an expression (17) according to the first embodiment.

FIG. 5 illustrates the relationship between r and a value obtained by multiplying a difference between $n_h$ $(r/r_{max})$ and $n_1$ by $d_h$ $(r/r_{max})$. As illustrated in FIG. 5, the value of $(n_h (r/r_{max})-n_1) \times d_h$ $(r/r_{max})$ is substantially constant regardless of r and satisfies the range of the expression (17).

Figure 6:
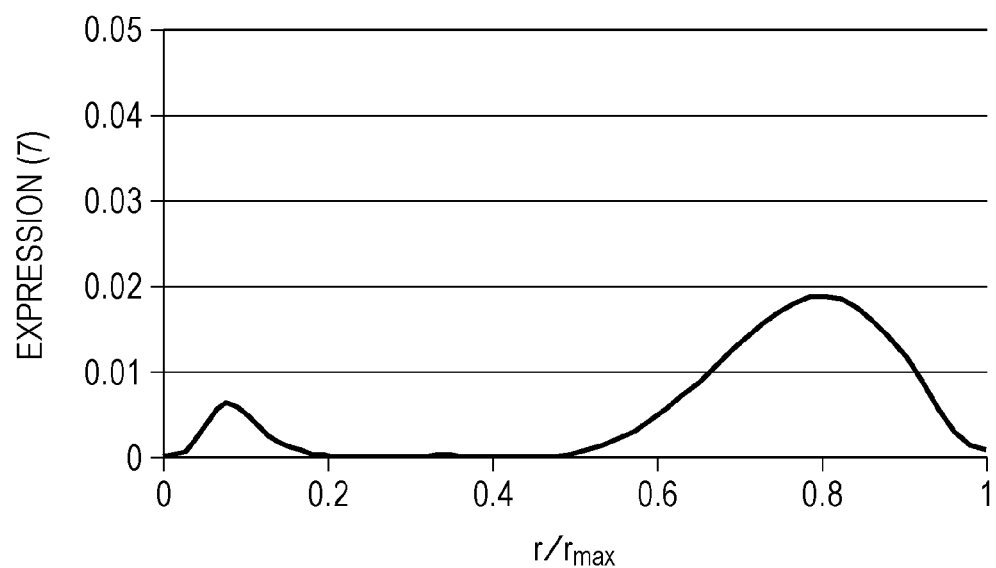
FIG. 6 illustrates a value in an expression (7) according to the first embodiment.

FIG. 6 illustrates the relationship between r and the value of the expression (7). As illustrated in FIG. 6, the DOE 10 satisfies the expression (7) regardless of r.

Figure 7:
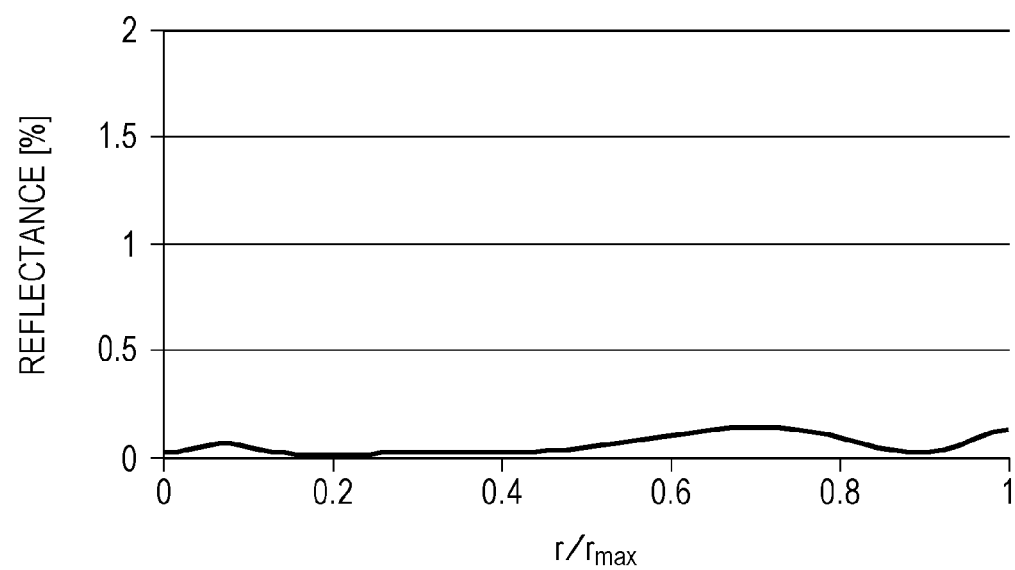
FIG. 7 illustrates a reflectance according to the first embodiment.

FIG. 7 illustrates the relationship between r and the reflectance of each grating surface of the DOE 10 according to the present embodiment. As illustrated in FIG. 7, it can be seen that the reflectance of each grating surface of the DOE 10 is a low value of 2% or less regardless of r, and the reflectance can be decreased.

Second Embodiment

A DOE according to a second embodiment will now be described. The DOE according to the present embodiment has the structure illustrated in FIG. 2 as in the first embodiment. The first diffraction grating 4 and the second diffraction grating 5 have the same optical constants as in the first embodiment. The refractive indices and the thicknesses of the films 6a and the films 6b alone differ from those in the first embodiment.

Figure 8A:
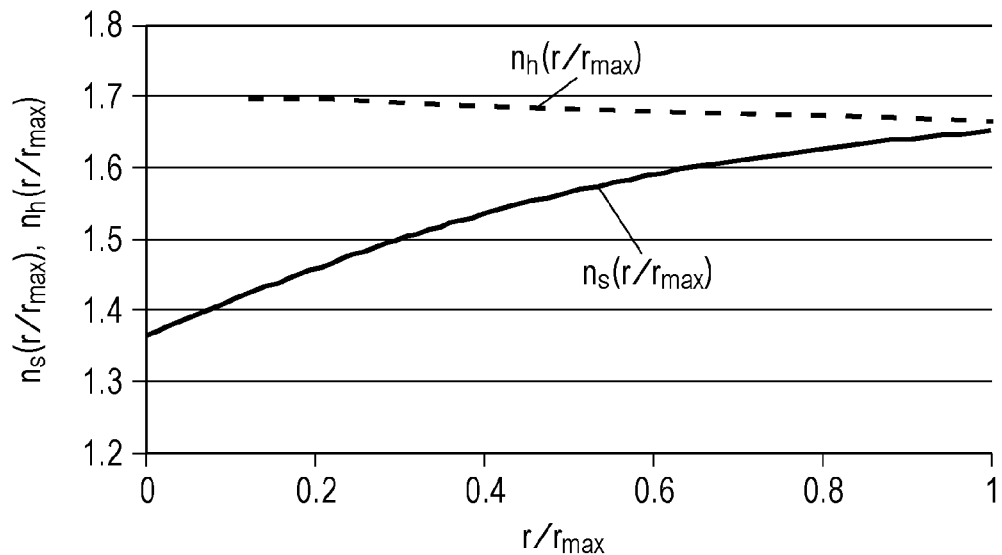
FIGS. 8A and 8B illustrate variations in the refractive indices of films and variations in the thicknesses thereof according to a second embodiment.

FIG. 8A illustrates the refractive index $n_s$ $(r/r_{max})$ of the films 6a of the DOE 10 according to the present embodiment with respect to light at a wavelength of 550 nm, and the refractive index $n_h$ $(r/r_{max})$ of the films 6b with respect to light at a wavelength of 550 nm. In FIG. 8A, $n_s(r/r_{max})$ is illustrated by a solid line, and $n_h$ $(r/r_{max})$ is illustrated by a dashed line.

As seen from FIG. 8A, in the DOE 10 according to the present embodiment, $n_s$ $(r/r_{max})$ is smaller than $n_h$ $(r/r_{max})$ regardless of the distance from the central axis O.

$n_{sa}$, which is obtained by averaging $n_s$ $(r/r_{max})$ with respect to r, is 1.5298. $n_{ha}$, which is obtained by averaging $n_h$ $(r/r_{max})$ with respect to r, is 1.6840. The DOE 10 according to the present embodiment satisfies the expression (3).

As r increases, $n_s$ $(r/r_{max})$ increases. As r increases, $n_h$ $(r/r_{max})$ decreases. That is, in the DOE 10 according to the present embodiment, the refractive index of the films 6a increases, and the refractive index of the films 6b decreases from the center to the periphery of the DOE 10.

Figure 8B:
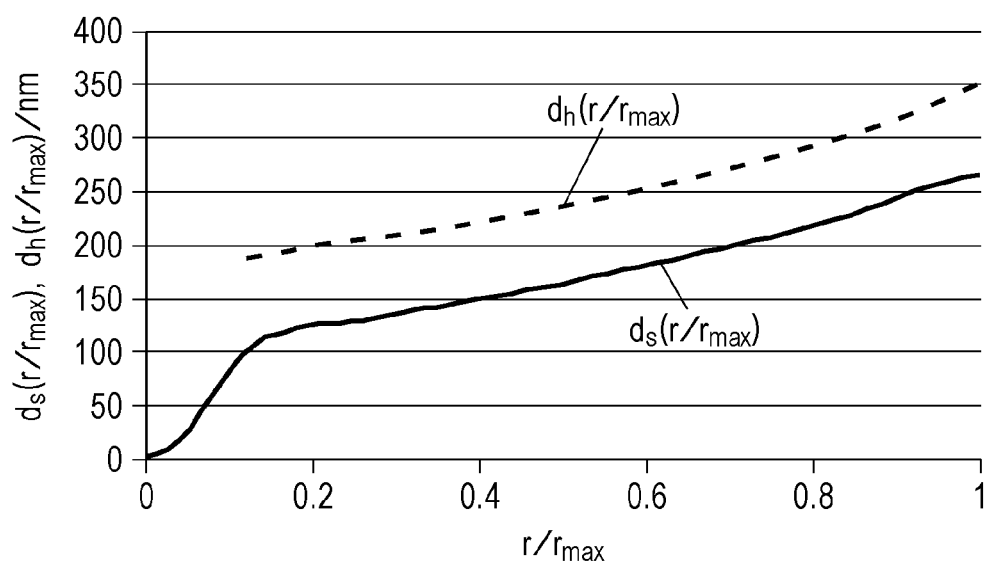

FIG. 8B illustrates the thickness $d_s$ $(r/r_{max})$ of the films 6a and the thickness $d_h$ $(r/r_{max})$ of the films 6b of the DOE 10 according to the present embodiment. In FIG. 8B, $d_s$ $(r/r_{max})$ is illustrated by a solid line, and $d_h$ $(r/r_{max})$ is illustrated by a dashed line.

As illustrated in FIG. 8B, $d_h$ $(r/r_{max})$ is larger than $d_s$ $(r/r_{max})$ regardless of the distance from the central axis O. $d_{sa}$, which is obtained by averaging $d_s$ $(r/r_{max})$ with respect to r, is 153 nm. $d_{ha}$, which is obtained by averaging $d_h$ $(r/r_{max})$ with respect to r, is 246 nm. The DOE 10 according to the present embodiment satisfies the expression (4).

As the distance from the central axis O increases, $d_s$ $(r/r_{max})$ and $d_h$ $(r/r_{max})$ increase. That is, in the DOE 10 according to the present embodiment, the thicknesses of the films 6a and the films 6b increase from the center to the periphery of the DOE 10.

Figure 9:
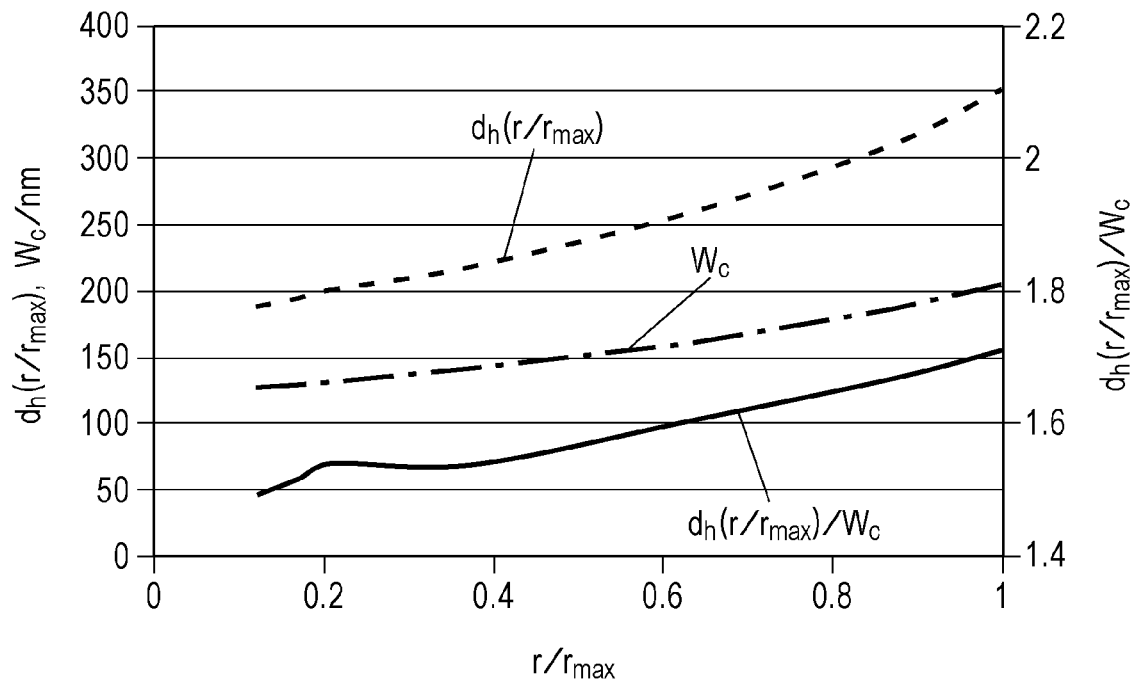
FIG. 9 illustrates the values in the expression (9) according to the second embodiment.

FIG. 9 illustrates $d_h$ $(r/r_{max})$, the average value $W_c$ of the cutoff width of the TE polarization and the cutoff width of the TM polarization, and $d_h$ $(r/r_{max})/W_c$ in the DOE 10 according to the present embodiment. The vertical axis on the left-hand side is referred for $d_h$ $(r/r_{max})$ illustrated by a dashed line and $W_c$ illustrated by a one-dot chain line. The vertical axis on the right-hand side is referred for $d_h$ $(r/r_{max})/W_c$ illustrated by a solid line.

As illustrated in FIG. 9, the DOE 10 according to the present embodiment satisfies the expression (9).

Figure 10:
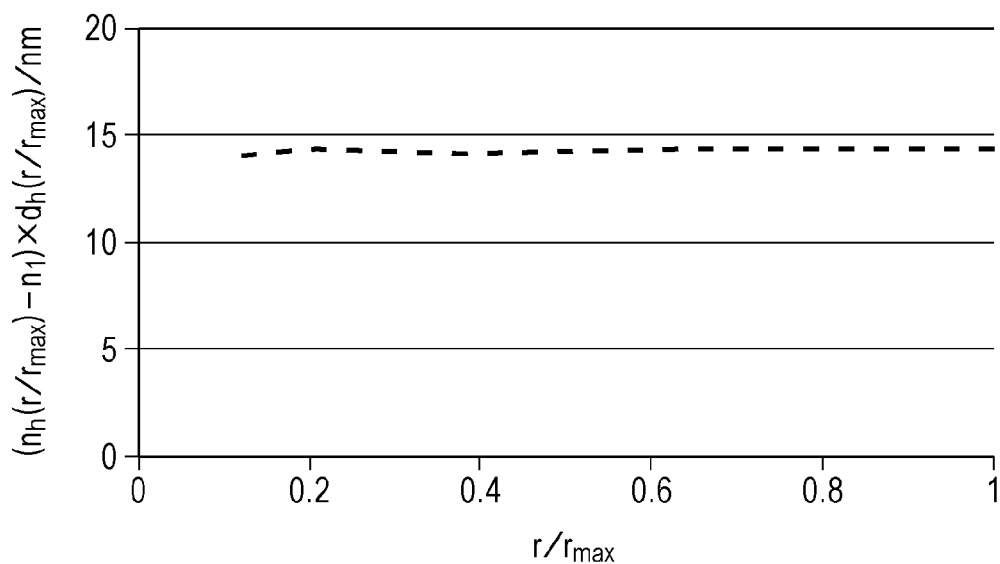
FIG. 10 illustrates the value in the expression (17) according to the second embodiment.

FIG. 10 illustrates the relationship between r and a value obtained by multiplying a difference between $n_h$ $(r/r_{max})$ and $n_1$ by $d_h$ $(r/r_{max})$ in the DOE 10 according to the present embodiment. As illustrated in FIG. 10, the value of $(n_h (r/r_{max})-n_1) \times d_h$ $(r/r_{max})$ is substantially constant regardless of r, and the DOE 10 according to the present embodiment satisfies the range of the expression (17).

Figure 11:
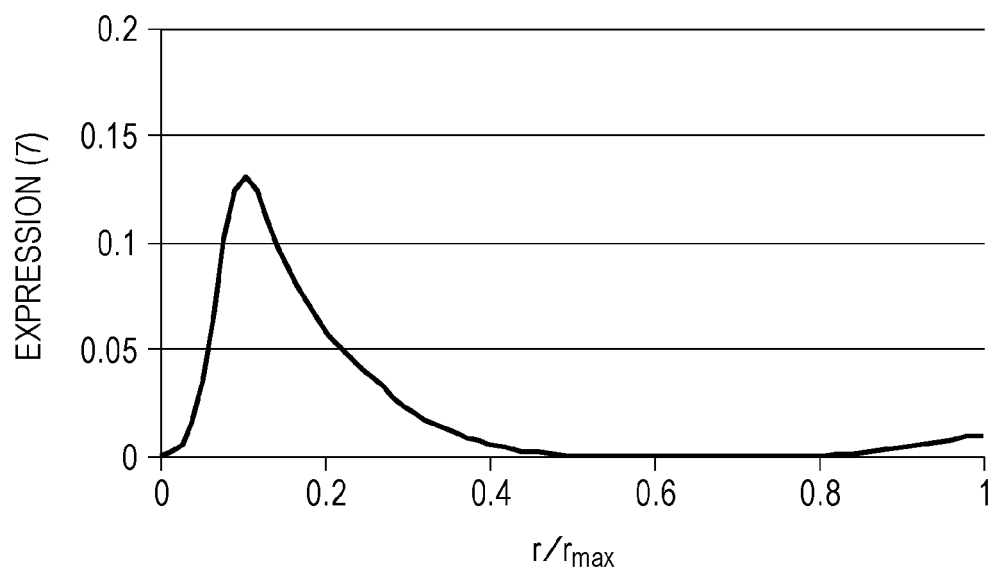
FIG. 11 illustrates the value in the expression (7) according to the second embodiment.

FIG. 11 illustrates the relationship between r and the value of the expression (7) in the DOE 10 according to the present embodiment. As illustrated in FIG. 11, the DOE 10 according to the present embodiment satisfies the expression (7) regardless of r.

Figure 12:
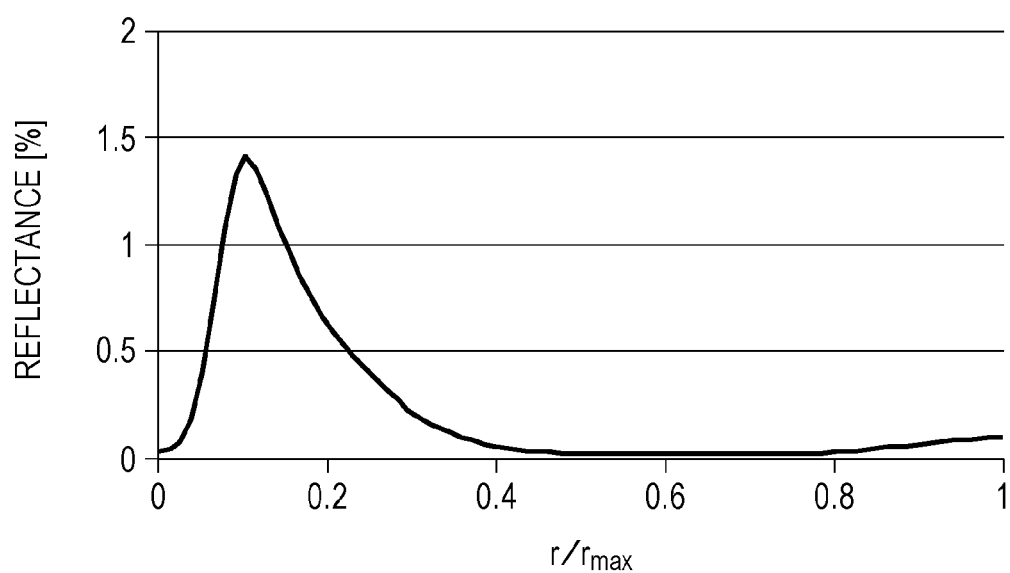
FIG. 12 illustrates the reflectance according to the second embodiment.

FIG. 12 illustrates the relationship between r and the reflectance of each grating surface of the DOE 10 according to the present embodiment. As illustrated in FIG. 12, the reflectance of each grating surface of the DOE 10 is a low value of 2% or less regardless of r, and the reflectance of each grating surface can be decreased also in the DOE 10 according to the present embodiment.

Third Embodiment

A DOE according to a third embodiment will now be described. The DOE according to the present embodiment has the structure illustrated in FIG. 2 as in the first embodiment and the second embodiment. The first diffraction grating 4 and the second diffraction grating 5 have the same optical constants as in the first embodiment and the second embodiment. The refractive indices and the thicknesses of the films 6a and the films 6b alone differ from those in the first embodiment and the second embodiment.

Figure 13A:
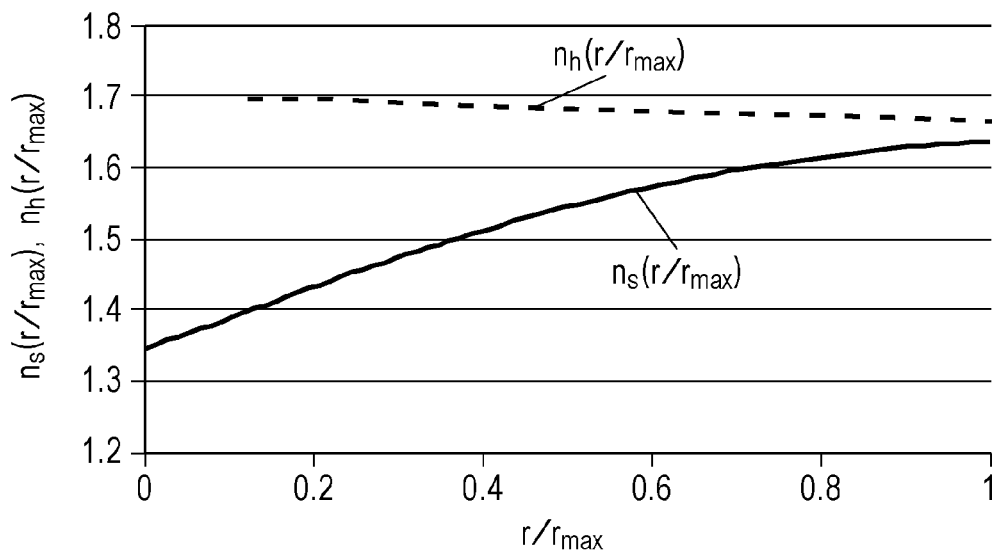
FIGS. 13A and 13B illustrate variations in the refractive indices of films and variations in the thicknesses thereof according to a third embodiment.

FIG. 13A illustrates the refractive index $n_s$ $(r/r_{max})$ of the films 6a of the DOE 10 according to the present embodiment with respect to light at a wavelength of 550 nm, and the refractive index $n_h$ $(r/r_{max})$ of the films 6b with respect to light at a wavelength of 550 nm. In FIG. 13A, $n_s(r/r_{max})$ is illustrated by a solid line, and $n_h$ $(r/r_{max})$ is illustrated by a dashed line.

As seen from FIG. 13A, in the DOE 10 according to the present embodiment, $n_s$ $(r/r_{max})$ is smaller than $n_h$ $(r/r_{max})$ regardless of the distance from the central axis O.

$n_{sa}$, which is obtained by averaging $n_s$ $(r/r_{max})$ with respect to r, is 1.5099. $n_{ha}$, which is obtained by averaging $n_h$ $(r/r_{max})$ with respect to r, is 1.6890. Accordingly, the DOE 10 according to the present embodiment satisfies the expression (3).

As r increases, $n_s$ $(r/r_{max})$ increases. As r increases, $n_h$ $(r/r_{max})$ decreases. That is, in the DOE 10 according to the present embodiment, the refractive index of the films 6a increases and the refractive index of the films 6b decreases from the center to the periphery of the DOE 10.

Figure 13B:
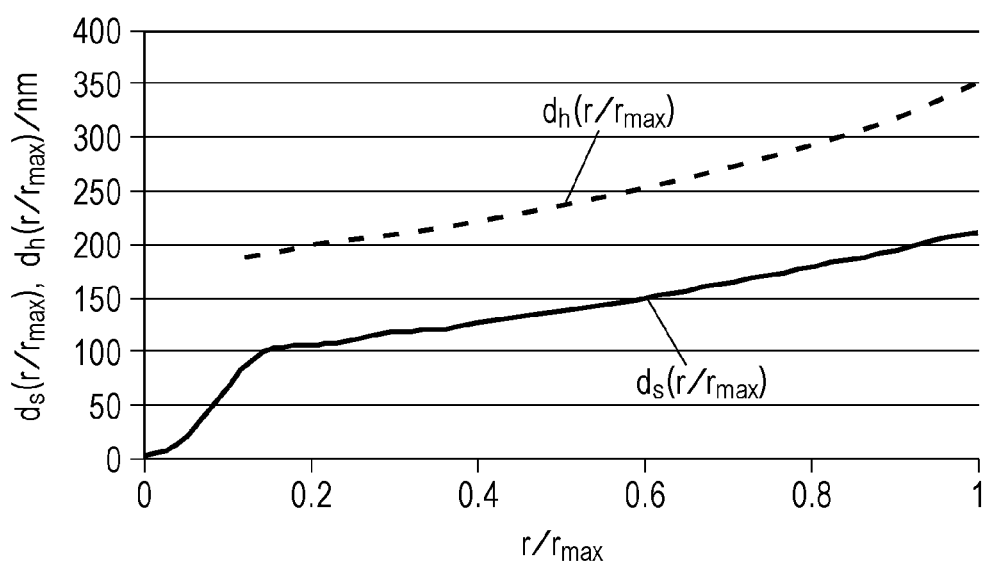

FIG. 13B illustrates the thickness $d_s$ $(r/r_{max})$ of the films 6a and the thickness $d_h$ $(r/r_{max})$ of the films 6b of the DOE 10 according to the present embodiment. In FIG. 13B, $d_s$ $(r/r_{max})$ is illustrated by a solid line, and $d_h$ $(r/r_{max})$ is illustrated by a dashed line.

As illustrated in 13B, $d_h$ $(r/r_{max})$ is larger than $d_s$ $(r/r_{max})$ regardless of the distance from the central axis O. $d_{sa}$, which is obtained by averaging $d_s$ $(r/r_{max})$ with respect to r, is 127 nm. $d_{ha}$, which is obtained by averaging $d_h$ $(r/r_{max})$ with respect to r, is 223 nm. Accordingly, the DOE 10 according to the present embodiment satisfies the expression (3).

As the distance from the central axis O increases, $d_s$ ($r/r_{max}$) and $d_h$ ($r/r_{max}$) increase. That is, in the DOE 10 according to the present embodiment, the thicknesses of the films 6a and the films 6b increase from the center to the periphery of the DOE 10.

Figure 14:
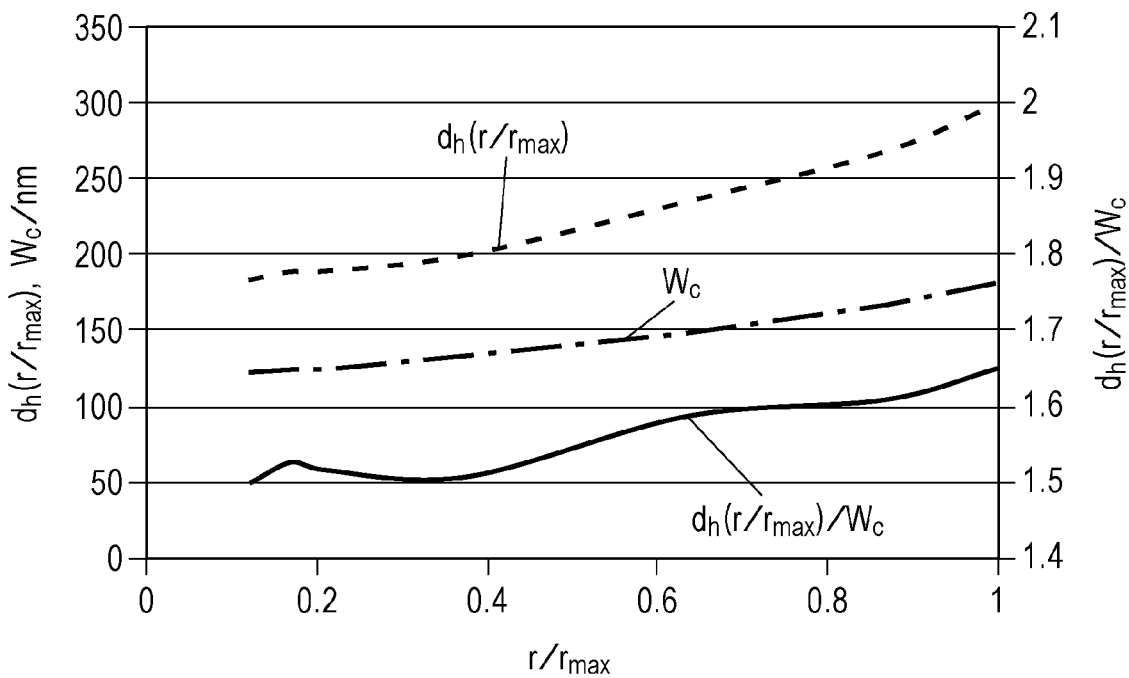
FIG. 14 illustrates the values in the expression (9) according to the third embodiment.

FIG. 14 illustrates $d_h$ ($r/r_{max}$), the average value $W_c$ of the cutoff width of the TE polarization and the cutoff width of the TM polarization, and $d_h$ ($r/r_{max}$)/$W_c$ in the DOE 10 according to the present embodiment. The vertical axis on the left-hand side is referred for $d_h$ ($r/r_{max}$) illustrated by a dashed line and $W_c$ illustrated by a one-dot chain line. The vertical axis on the right-hand side is referred for $d_h$ ($r/r_{max}$)/$W_c$ illustrated by a solid line.

As illustrated in FIG. 14, the DOE 10 according to the present embodiment satisfies the expression (9).

Figure 15:
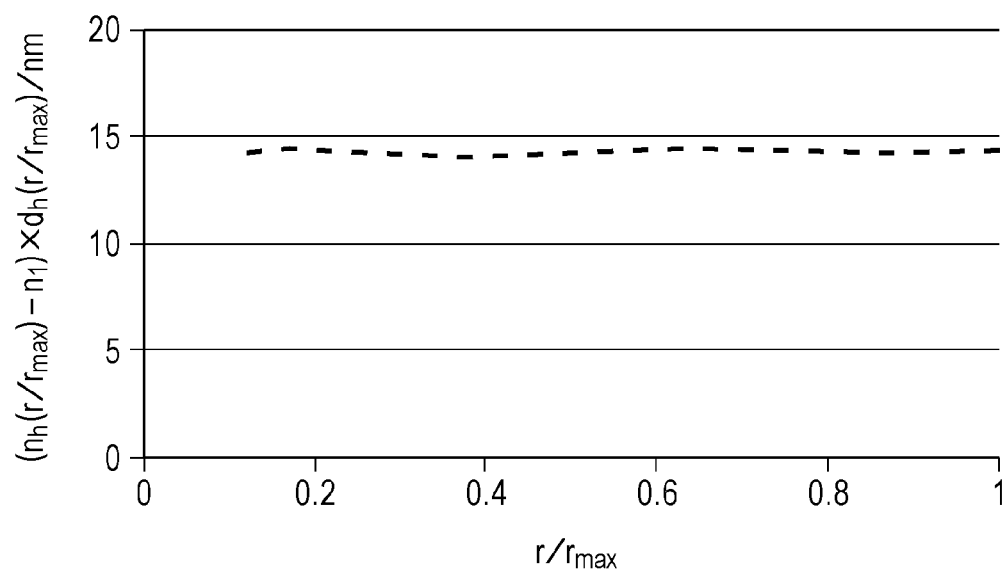
FIG. 15 illustrates the value in the expression (17) according to the third embodiment.

FIG. 15 illustrates the relationship between r and a value obtained by multiplying a difference between $n_h$ ($r/r_{max}$) and $n_1$ by $d_h$ ($r/r_{max}$) in the DOE 10 according to the present embodiment. As illustrated in FIG. 15, the value of ($n_h$ ($r/r_{max}$)−$n_1$)×$d_h$ ($r/r_{max}$) is substantially constant regardless of r, and the DOE 10 according to the present embodiment satisfies the range of the expression (17).

Figure 16:
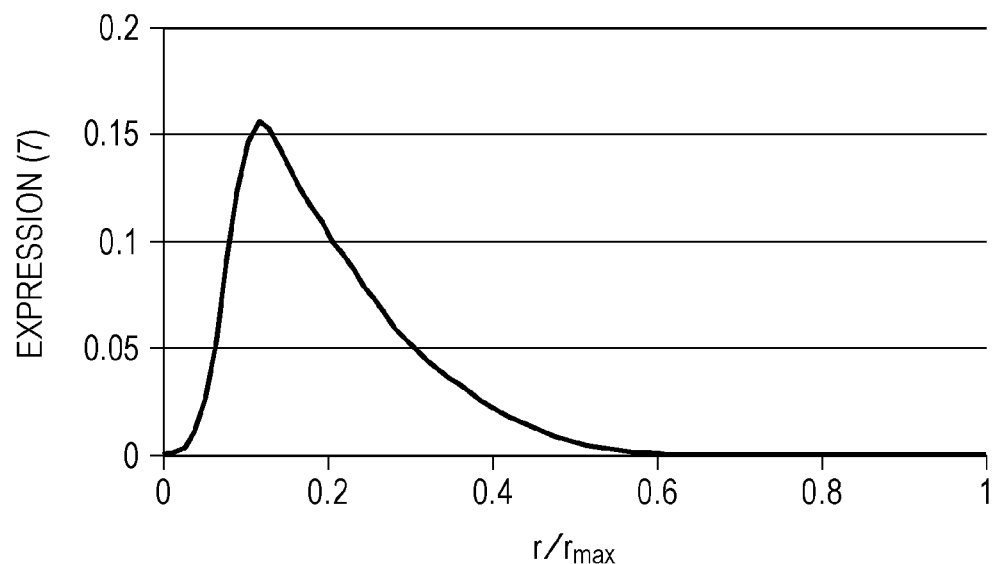
FIG. 16 illustrates the value in the expression (7) according to the third embodiment.

FIG. 16 illustrates the relationship between r and the value of the expression (7) in the DOE 10 according to the present embodiment. As illustrated in FIG. 16, the DOE 10 according to the present embodiment satisfies the expression (7) regardless of r.

Figure 17:
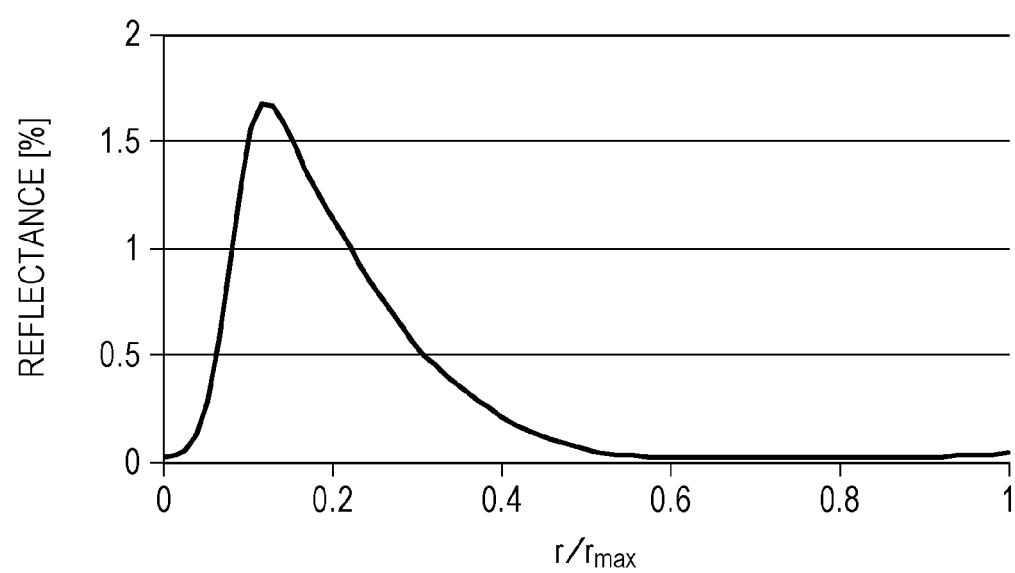
FIG. 17 illustrates the reflectance according to the third embodiment.

FIG. 17 illustrates the relationship between r and the reflectance of each grating surface of the DOE 10 according to the present embodiment. As illustrated in FIG. 17, the reflectance of each grating surface of the DOE 10 is a low value of 2% or less regardless of r, and the reflectance of each grating surface can be decreased also in the DOE 10 according to the present embodiment.

Table 1 summarizes various values in the DOEs according to the first to third embodiments.

Table 1 illustrates the values at a wavelength of 550 nm.

TABLE 1

| | EMBODIMENTS | | |
|---|---|---|---|
| | 1 | 2 | 3 |
| $n_1$ | 1.6230 | 1.6230 | 1.6230 |
| $n_2$ | 1.5724 | 1.5724 | 1.5724 |
| $vd_1$ | 43.2 | 43.2 | 43.2 |
| $vd_2$ | 19.0 | 19.0 | 19.0 |
| $n_{ha}$ | 1.6807 | 1.6840 | 1.6890 |
| $n_{sa}$ | 1.6216 | 1.5298 | 1.5099 |
| Δ | 0.034 | 0.036 | 0.038 |
| $d_{ha}$ (nm) | 268 | 246 | 223 |
| $d_{sa}$ (nm) | 193 | 153 | 127 |
| $d_{hc}$ (nm) | 195 | 201 | 191 |
| $d_{he}$ (nm) | 363 | 303 | 264 |
| $d_{sc}$ (nm) | 109 | 96 | 82 |
| $d_{se}$ (nm) | 315 | 233 | 188 |
| $n_{hc}$ | 1.6941 | 1.6937 | 1.6977 |
| $n_{he}$ | 1.6616 | 1.6707 | 1.6773 |
| EXPRESSION (6) | 0.72 | 0.62 | 0.57 |
| EXPRESSION (7) MAXIMUM VALUE | 0.0257 | 0.2145 | 0.2516 |
| EXPRESSION (8) MAXIMUM VALUE | 0.0189 | 0.1307 | 0.1554 |
| EXPRESSION (9) MINIMUM VALUE | 1.44 | 1.49 | 1.50 |
| EXPRESSION (9) MAXIMUM VALUE | 1.73 | 1.71 | 1.65 |
| EXPRESSION (17) (nm) | 15.5 | 15.0 | 14.7 |
| EXPRESSION (23) | 0.990 | 0.990 | 0.990 |

Fourth Embodiment

An optical system according to a fourth embodiment will now be described. It has been known that the use of a refractive optical element and a DOE enables the chromatic aberration of an optical system to be decreased. The optical system according to the present embodiment decreases the chromatic aberration by using the DOE. The optical system according to the present embodiment can be used, for example, as an optical system of an imaging apparatus.

Figure 18:
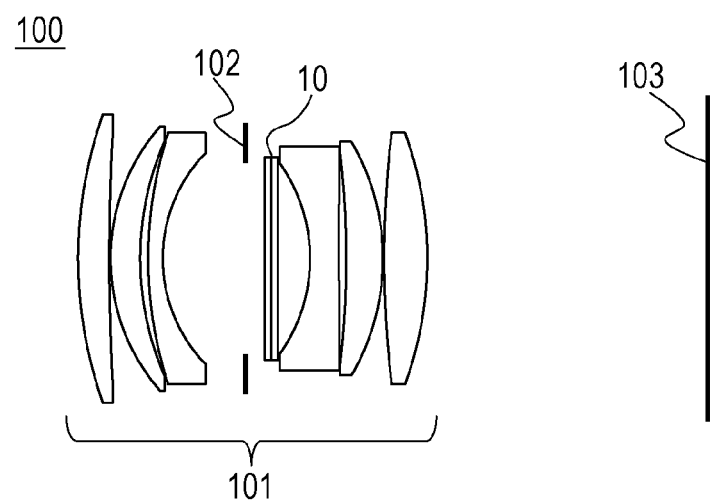
FIG. 18 is a schematic view of an optical system according to a fourth embodiment.

FIG. 18 illustrates an optical system 100 according to the present embodiment. The optical system 100 according to the present embodiment includes optical elements 101. One of the optical elements 101 is the DOE 10, and the others are refractive optical elements (lenses). The DOE 10 according to the present embodiment has the same characteristics as in any one of the first to third embodiments.

In FIG. 18, a stop is denoted by 102, and an image plane is denoted by 103.

As described according to the first to third embodiments, the DOE 10 decreases the reflectance of each grating surface. This enables a flare or a ghost to be inhibited from occurring due to reflected light from each grating surface of the DOE 10. Consequently, a high quality image can be obtained.

According to the present embodiment, the DOE 10 is disposed on a glass plate located near the stop 102. The present invention, however, is not limited thereto. The DOE 10 may be disposed on a concave surface or a convex surface of one of the lenses.

According to the present embodiment, the optical system 100 includes the DOE 10. The present invention, however, is not limited thereto. The optical system 100 may include plural DOEs.

Fifth Embodiment

An optical system of a fifth embodiment will now be described. The optical system according to the present embodiment can be used, for example, as an optical system of binoculars.

Figure 19:
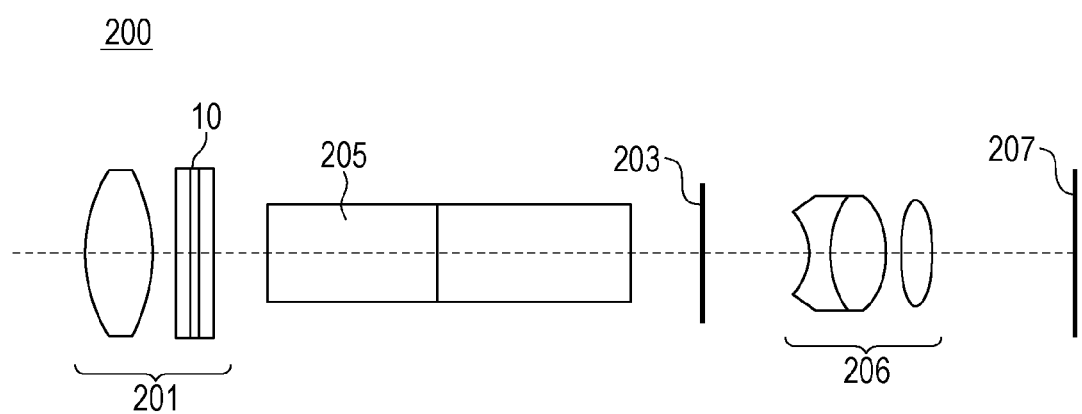
FIG. 19 is a schematic view of an optical system according to a fifth embodiment.

FIG. 19 illustrates an optical system 200 according to the present embodiment. The optical system 200 according to the present embodiment includes an objective lens portion 201, a prism 205, and an eyepiece portion 206. A pupil plane is denoted by 207.

The objective lens portion 201 includes a refractive optical element (lens) and the DOE 10. This enables the chromatic aberration of an image plane 203 to be decreased. The DOE 10 according to the present embodiment has the same characteristics as in any one of the first to third embodiments.

As described according to the first to third embodiments, the DOE 10 decreases the reflectance of each grating surface. This enables a flare or a ghost to be inhibited from occurring due to reflected light from each grating surface of the DOE 10. Consequently, a high quality image can be obtained also by the optical system 200 according to the present embodiment.

According to the present embodiment, the DOE 10 is disposed on a glass plate that the objective lens portion 201 includes. The present invention, however, is not limited thereto. The DOE 10 may be disposed on a concave surface or a convex surface of the lens.

According to the present embodiment, the optical system 200 includes the DOE 10. The present invention, however, is not limited thereto. The optical system 200 may include plural DOEs.

According to the present embodiment, the objective lens portion 201 includes the DOE 10. The DOE 10, however, may be disposed on a surface of the prism 205 or the eyepiece 206. However, the DOE 10 is preferably disposed nearer than the image plane 203 to an object, for the DOE 10 disposed nearer than the image plane 203 to the object can decrease the chromatic aberration of the objective lens portion 201.

According to the present embodiment, an observation optical system of binoculars is described. However, the diffractive optical element according to the present invention can be used for an optical system such as a telescope.

The diffractive optical element can be used also for optical finders such as a lens shutter camera and a video camera.

Sixth Embodiment

An imaging apparatus according to a sixth embodiment will now be described.

Figure 20:
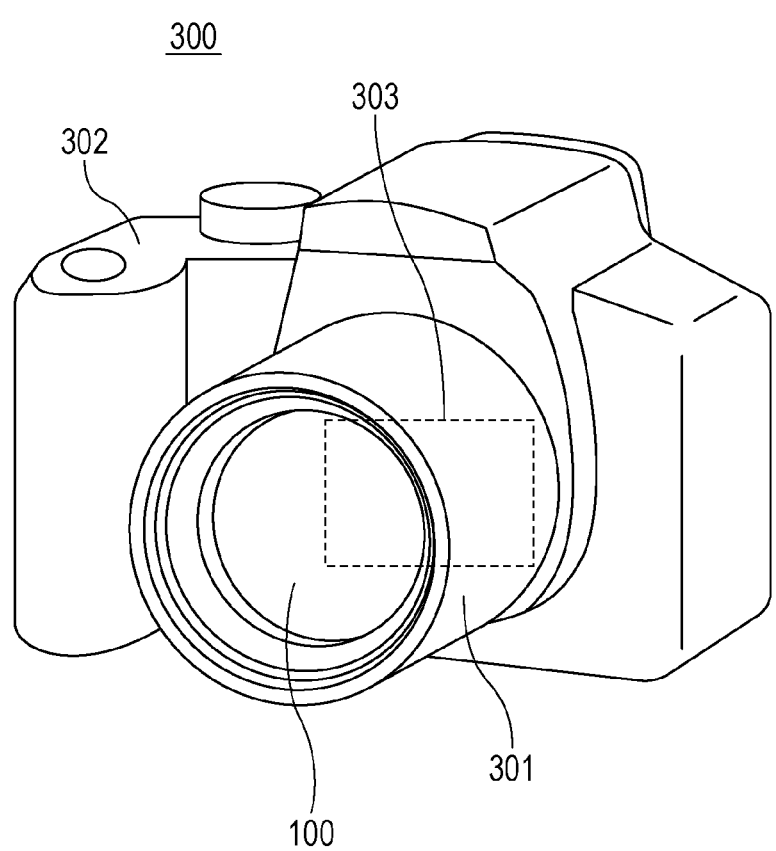
FIG. 20 is a schematic view of an imaging apparatus according to a sixth embodiment.

FIG. 20 illustrates a digital camera 300 as the imaging apparatus according to the present embodiment. The digital camera 300 includes the optical system 100 according to the fourth embodiment installed in a lens portion 301. An imaging element 303 such as a CCD or CMOS sensor is disposed on the image plane 103 of the optical system 100 in a main body 302.

The digital camera 300 including the optical system 100 can obtain a high quality image with the occurrence of a flare or a ghost decreased.

FIG. 20 illustrates an example of the main body 302 and the lens portion 301 that are integrally formed. The present invention, however, can be used as a lens device that is attachable to and detachable from the main body of the imaging apparatus. Such a lens device is used, for example, as an interchangeable lens for use in a single-lens camera. In this case, it can be said that FIG. 20 illustrates a state where the lens device 301 including the optical system 100 is mounted on the main body 302 of the imaging apparatus.

The preferred embodiments and examples of the present invention are described above. The present invention, however, is not limited to the embodiments and the examples. Various combinations, variations, and modifications can be made without departing from the concept thereof. Accordingly, the following claims are attached to make the scope of the present invention public.

The present invention enables a decrease in the reflectance of each grating surface in the diffractive optical element including the films between the first diffraction grating and the second diffraction grating.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A diffractive optical element comprising:
a first diffraction grating;
a second diffraction grating; and
a film formed between the first diffraction grating and the second diffraction grating,
wherein the film includes first parts formed between grating wall surfaces of the first diffraction grating and grating wall surfaces of the second diffraction grating, and second parts formed between grating surfaces of the first diffraction grating and grating surfaces of the second diffraction grating,
wherein each of the first and second parts are in contact with both of the first and second diffraction gratings, and
wherein the following conditional expressions are satisfied:

$n_2 < n_1 < n_{ha}$, and $n_{sa} < n_{ha}$, where $n_{ha}$ is a total average refractive index of the first parts at a wavelength of 550 nm,
$n_{sa}$ is a total average refractive index of the second parts at a wavelength of 550 nm,
$n_1$ is a refractive index of the first diffraction grating at a wavelength of 550 nm, and
$n_2$ is a refractive index of the second diffraction grating at a wavelength of 550 nm.

2. A diffractive optical element comprising:
a first diffraction grating;
a second diffraction grating; and
a film formed between the first diffraction grating and the second diffraction grating,
wherein the film includes first parts formed between grating wall surfaces of the first diffraction grating and grating wall surfaces of the second diffraction grating, and second parts formed between grating surfaces of the first diffraction grating and grating surfaces of the second diffraction grating,
wherein each of the first and second parts are in contact with both of the first and second diffraction gratings, and
wherein the following conditional expressions are satisfied:

$n_2 < n_1 < n_{ha}$, and $d_{sa} < d_{ha}$, where $n_{ha}$ is a total average refractive index of the first parts at a wavelength of 550 nm,
$d_{ha}$ is an average thickness of the first parts,
$d_{sa}$ is an average thickness of the second parts,
$n_1$ is a refractive index of the first diffraction grating at a wavelength of 550 nm, and
$n_2$ is a refractive index of the second diffraction grating at a wavelength of 550 nm.

3. The diffractive optical element according to claim 2, wherein the following conditional expression is satisfied:

$0.1 < d_{sa}/d_{ha} < 0.9$.

4. The diffractive optical element according to claim 2, wherein $n_{sa}$ is less than $n_{ha}$, where $n_{sa}$ is a total average refractive index of the second parts at a wavelength of 550 nm.

5. The diffractive optical element according to claim 1, wherein the following conditional expression is satisfied:

$7 < (n_{ha} - n_1) \times d_{ha} < 30$ [nm], where $d_{ha}$ is an average thickness of the first parts.

6. The diffractive optical element according to claim 1, wherein the following conditional expression is satisfied:

$0.005 < \Delta < 0.045$, where $\Delta$ is given as:

$$\Delta = \frac{n_{ha}^2 - n_1^2}{2n_{ha}^2}.$$

7. The diffractive optical element according to claim 1, wherein the following conditional expression is satisfied:

$$|(2n_{sa}-n_1-n_2)/(n_{ha}-n_1)|<5.$$

8. The diffractive optical element according to claim 1, wherein both of the first and second diffraction gratings are concentric.

9. The diffractive optical element according to claim 8, wherein the following conditional expression is satisfied:

$$(n_1+n_2-2n_s(r))^2<0.3,$$

where $n_s(r)$ is a refractive index at a wavelength of 550 nm of a part of the film that is formed between the grating surface of the first diffraction grating and the grating surface of the second diffraction grating at a position a distance r away from a center of the concentric diffraction gratings.

10. The diffractive optical element according to claim 8, wherein the following conditional expression is satisfied:

$$[\sin\{\alpha \times d_s(r)\} \times \{n_1+n_2-2n_s(r)\}]^2<0.2, \text{ and}$$

$$\alpha=0.016564 \text{ nm}^{-1},$$

where $d_s(r)$ [nm] is a thickness of a part of the film that is formed between the grating surface of the first diffraction grating and the grating surface of the second diffraction grating at a position a distance r away from a center of the concentric diffraction gratings, and $n_s(r)$ is a refractive index at a wavelength of 550 nm of the part of the film that is formed between the grating surface of the first diffraction grating and the grating surface of the second diffraction grating at the position a distance r away from a center of the concentric diffraction gratings.

11. The diffractive optical element according to claim 8, wherein the following conditional expression is satisfied at a wavelength of 550 nm:

$$0.5 \le d_h(r)/W_c \le 2,$$

where $d_h(r)$ [nm] is a thickness of a part of the film that is formed between the grating wall surface of the first diffraction grating and the grating wall surface of the second diffraction grating at a position a distance r away from a center of the concentric diffraction gratings, $n_h(r)$ is a refractive index of the part of the film that is formed between the grating wall surface of the first diffraction grating and the grating wall surface of the second diffraction grating at the position a distance r away from a center of the concentric diffraction gratings, and $W_c$ is an average cutoff width at a wavelength $\lambda$ [nm] that is given as:

$$W_c=(W_{c,TE}+W_{c,TM})/2, \text{ where}$$

$$W_{C,TE} = \frac{1}{\kappa_C}\tan^{-1}\left(\frac{\delta_C}{\kappa_C}\right)$$

$$W_{C,TM} = \frac{1}{\kappa_C}\tan^{-1}\left(\frac{n_h^2(r)\delta_C}{n_2^2\kappa_C}\right)$$

$$\kappa_C = k_0\sqrt{n_h^2(r) - n_1^2}$$

$$\delta_C = k_0\sqrt{n_1^2 - n_2^2}$$

$$k_0 = 2\pi/\lambda.$$

12. The diffractive optical element according to claim 8, wherein the following conditional expression is satisfied:

$$d_{sc}<d_{se},$$

where $d_s(r)$ is a thickness of a part of the film formed between the grating surface of the first diffraction grating and the grating surface of the second diffraction grating at a position a distance r away from a center of the concentric diffraction gratings, $r_{max}$ is a radius of a boundary that is farthest from the center of the concentric diffraction gratings and between the grating surface and the grating wall surface of the first diffraction grating, $d_{sc}$ is an average value of $d_s(r)$ in a range in which a distance from the center of the concentric diffraction gratings is no less than 0 and no more than $r_{max}/3$, and $d_{se}$ is an average value of $d_s(r)$ in a range in which the distance from the center of the concentric diffraction gratings is no less than $2r_{max}/3$ and no more than $r_{max}$.

13. The diffractive optical element according to claim 8, wherein the following conditional expression is satisfied:

$$d_{hc}<d_{he},$$

where $d_h(r)$ is a refractive index at a wavelength of 550 nm of a part of the films that is formed between the grating wall surface of the first diffraction grating and the grating wall surface of the second diffraction grating at a position a distance r away from a center of the concentric diffraction gratings, $r_{max}$ is a radius of a boundary that is farthest from the center of the concentric diffraction gratings and between the grating surface and the grating wall surface of the first diffraction grating, $d_{hc}$ is an average value of $d_h(r)$ in a range in which a distance from the center of the concentric diffraction gratings is no less than 0 and no more than $r_{max}/3$, and $d_{he}$ is an average value of $d_h(r)$ in a range in which the distance from the center of the concentric diffraction gratings is no less than $2r_{max}/3$ and no more than $r_{max}$.

14. An optical system comprising: optical elements, wherein at least one of the optical elements is the diffractive optical element according to claim 1.

15. An imaging apparatus comprising: an imaging element; and the optical system according to claim 14.

16. A lens device comprising: the optical system according to claim 14, wherein the lens device is attachable to and detachable from a main body of an imaging apparatus.

17. The diffractive optical element according to claim 1, wherein the following conditional expression is satisfied:

$$d_{sa}<d_{ha},$$

where $d_{ha}$ is an average thickness of the first parts, and $d_{sa}$ is an average thickness of the second parts.

* * * * *